(12) United States Patent
Sich

(10) Patent No.: US 6,416,034 B1
(45) Date of Patent: *Jul. 9, 2002

(54) ECP MANIFOLD VENT VALVE INSERT

(75) Inventor: Gary M. Sich, Irwin, PA (US)

(73) Assignee: Wabtec Corporation, Wilmerding, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/605,439

(22) Filed: Jun. 28, 2000

(51) Int. Cl.$^7$ .............................................. F16K 31/122
(52) U.S. Cl. ................. 251/63.6; 137/596.18; 251/64
(58) Field of Search ................ 137/596.18; 251/63.6, 251/64

(56) References Cited

U.S. PATENT DOCUMENTS 5,778,918 A * 7/1998 McLelland ............. 251/63.6 X

* cited by examiner

*Primary Examiner*—Gerald A. Michalsky
(74) *Attorney, Agent, or Firm*—James Ray & Associates

(57) ABSTRACT

A vent valve insert comprises a bushing assembly, a piston assembly and a spring. It is designed to fit snugly and sealingly within a suitable borehole, such as the vent borehole of an ECP manifold assembly. The bushing assembly defines a longitudinal bore within which the piston assembly is situated. When pilot pressure is applied to its top surface, the piston assembly is forced to an open position wherein fluid is allowed to flow through the vent valve insert. Absent pilot pressure acting against the top surface, the spring acts to force the piston assembly upward within the longitudinal bore. Secured to the bottom portion of the piston assembly, an annular sealing member is carried upward so that its flat surface seats against a raised inner portion of an annular valve seat. The vent valve insert is thus normally biased to the closed position. The vent valve insert also features a mechanism for preventing non-longitudinal movement of the piston assembly as it is moved longitudinally within the longitudinal bore. The mechanism not only guides the movement of the piston assembly within the bushing assembly but also prevents the bell clapper effect inherent to the vent valve inserts currently used in the industry.

16 Claims, 5 Drawing Sheets

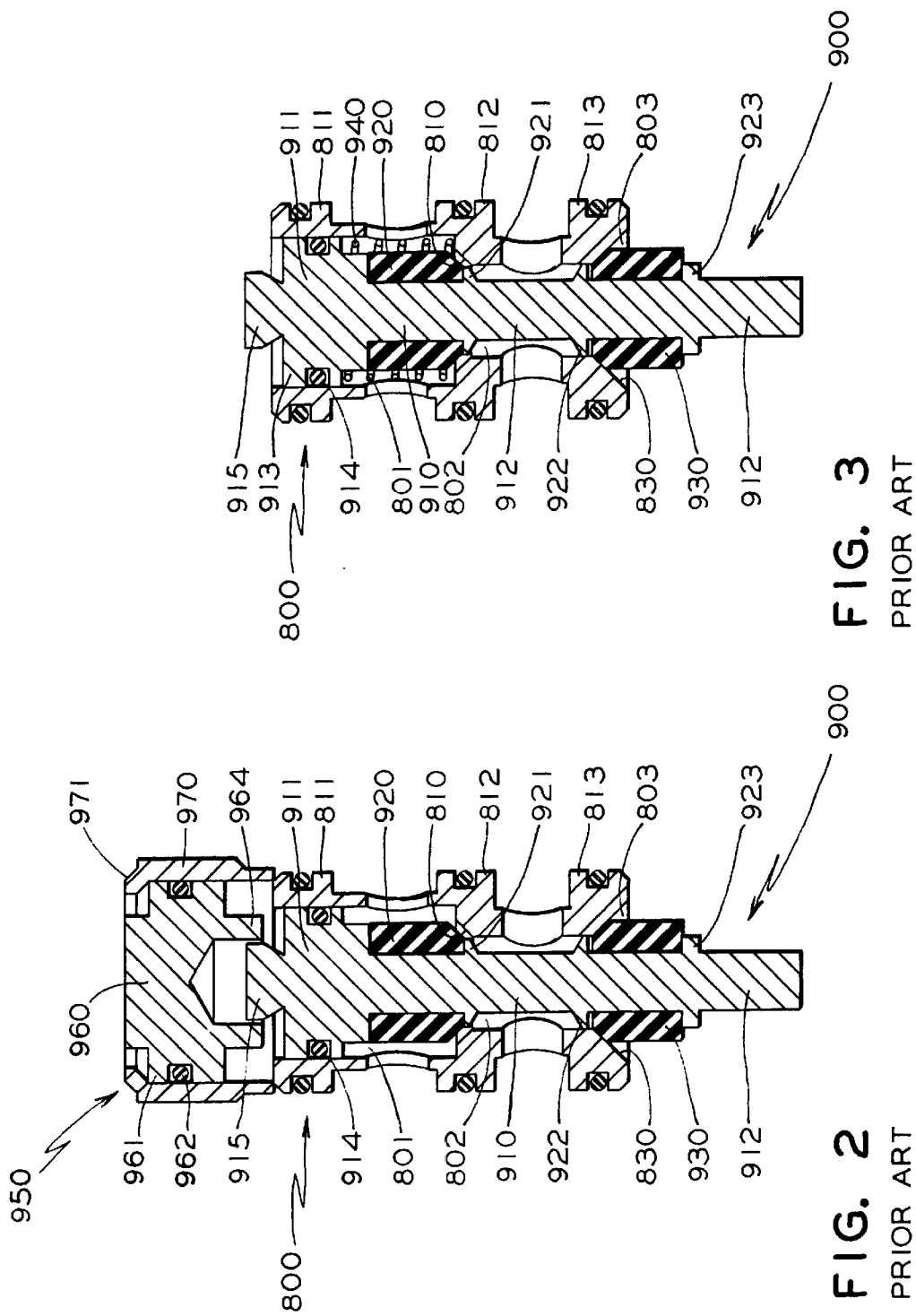

ECP MANIFOLD VENT VALVE INSERT

CROSS-REFERENCE TO RELATED DOCUMENTS

The invention is related to an application for patent bearing U.S. Ser. No. 09/605,762 entitled ECP Manifold Valve Inserts. That application for patent has the same assignee and filing date, Jun. 28, 2000, as this document, and its teachings are incorporated into this document by reference.

FIELD OF THE INVENTION

The invention generally relates to valve assemblies (also referred to as "valve inserts") of the type deployed within a manifold to control the flow of fluid(s) within a system in which the manifold is incorporated. More particularly, the invention pertains to a vent valve insert designed to be deployed within a manifold of a freight railcar equipped with electrically controlled pneumatic (ECP) brake equipment.

BACKGROUND OF THE INVENTION

The following background information is provided to assist the reader to understand just one of the many environments in which the invention could be used. The terms used herein are not intended to be limited to any particular narrow interpretation unless expressly stated otherwise in this document.

A freight train typically includes one or more locomotives, a plurality of railcars and several trainlines. For a freight train headed by a locomotive equipped with an ECP brake control system, the trainlines include both pneumatic and electrical lines some of which run from the lead locomotive all the way to the last rail vehicle in the train. A pneumatic trainline known as the brake pipe is one such trainline. It extends the length of the freight train, as does a two-wire electrical trainline known as the ECP trainline. Each locomotive also features a multi-wire electrical trainline known as the multiple unit (MU) line cable. The MU line cable consists of 27 different electrical lines. As is well known in the railroad industry, the MU line cable contains 74V dc power and return lines on which battery power from the locomotive is supplied to the various power consuming devices on the train.

The brake pipe consists of a series of pipe lengths, with one pipe length secured to the underside of each railcar. Each pipe length has, at each of its ends, a flexible hose with a coupler commonly referred to as a glad hand. As the locomotive(s) and other rail vehicles are coupled in sequence to form the freight train, the brake pipe is formed by connecting the glad hand at the end of each pipe length to the glad hand of another such pipe length on an adjacent railcar. Similar to the brake pipe, the conduit in which the ECP trainline is housed actually constitutes a series of individual conduits. One such conduit secured to the underside of each vehicle interconnects to another such conduit via a connector between each rail vehicle. Supplied from the 74V dc power line of the MU line cable in the locomotive, the ECP trainline typically operates at a nominal 230V dc to power the ECP brake equipment on each railcar of the freight train.

The ECP brake control system in the locomotive includes a cab station unit and a master controller from which the brakes on the train are ultimately controlled. The cab station unit features one or two handle(s) and/or push buttons that the train operator uses to direct control of the brakes. One such handle, known as the automatic brake handle, can be moved to and between the following positions: release, minimum service, full service, suppression, continuous service, and emergency. Between the minimum and full service positions lies the service zone wherein each incremental movement of the handle toward the full service position causes an even stronger service application of the brakes. The force with which the service brakes will apply depends on how far towards the full service position the automatic brake handle is moved.

Inputs from the handle(s) and/or push buttons are processed by the cab station unit and then passed to the master controller. Operating according to instructions contained within its programming code, and in response to the inputs from the handle(s) and other sources, the master controller formulates a brake command appropriate to current conditions and transmits it along the ECP trainline to each railcar in the freight train. As specified by the American Association of Railroads (AAR), the brake commands and other ECP messages are transmitted from the locomotive using a powerline communications system such as the Echelon Lon-Works System. Along the ECP trainline, the brake command (s) are then conveyed to the ECP brake equipment on each railcar via branch wiring. Similarly, in a manner known in the railroad industry, the brake pipe connects to the ECP brake equipment on each railcar via a branch pipe.

The master controller can thus order, through the brake command, any action from a release of brakes to an emergency application of brakes or any degree of brake application in between those two extremes. The brake equipment may also be designed to provide graduated release of the brakes. The degree of brake application ordered by the master controller is typically conveyed in terms of a percentage of the pressure required for full service brake application. For example, zero percent (0%) is typically designated for a release of brakes, 15% for a minimum service brake application, 100% for a full service brake application and 120% for an emergency brake application.

The ECP brake equipment on each rail vehicle typically includes a car control unit (CCU), several pressure transducers, various pneumatic and/or electropneumatic valves, an auxiliary reservoir, an emergency reservoir, and at least one brake cylinder. Used to monitor the pressures in the brake pipe, the brake cylinder(s) and the two reservoirs, the transducers convey electrical signals indicative of those pressures to the CCU.

Each CCU includes a transceiver and a microprocessor. Controlled by the microprocessor, the transceiver is connected via the branch wiring to the ECP trainline from which it receives the brake commands issued by the master controller. The transceiver converts the electrical brake commands into a form usable by the microprocessor. Operating according to its programming code and to the dictates of the brake commands and other electrical signals it has received, the microprocessor controls the aforementioned electropneumatic valves in a manner well known in the brake control art. It is through these electropneumatic valves that air can be maintained within, exhausted from, or directed from the reservoir(s) to the brake cylinder(s). By moving the automatic brake handle into service zone, for example, the train operator in the locomotive will cause the ECP brake control system to issue a service brake command along the ECP trainline. In response to the service brake command, the microprocessor on each railcar will then route the appropriate amount of air from the auxiliary reservoir, or, alternatively, the emergency reservoir, through the appropriate electropneumatic valve(s) to the brake cylinder(s).

In addition, as a safety measure, emergency brake commands are conveyed to the railcars not only electrically along the ECP trainline but also pneumatically along the brake pipe. By moving the handle into the emergency position, the train operator in the locomotive causes the pressure in the brake pipe to drop at an emergency rate. This drop in pressure then quickly propagates along the brake pipe to each railcar in the train. Should the ECP equipment lose power or otherwise fail electrically, it will still respond pneumatically to the telltale reduction in pressure that occurs in the brake pipe during an emergency. The ECP brake equipment is designed to respond to the emergency pressure drop by supplying pressurized air from both the auxiliary and emergency reservoirs to the brake cylinder(s) and thereby cause an emergency application of the brakes. Absent a command to apply the brakes and under conditions known in the brake control art, the railcar brake equipment through one of its pneumatic valves charges these two reservoirs with pressurized air obtained from the brake pipe.

However pressurized, the brake cylinder(s) convert the pressurized air that they receive to mechanical force. This mechanical force is transmitted by mechanical linkage to the brake shoes. Forced against the wheels and/or disc brakes, the brake shoes are used to slow or stop the rotation of the wheels. The magnitude of the braking force applied to the wheels is directly proportional to the pressure built up in the brake cylinder(s).

As is well known in the railroad industry, an ECP brake control system is typically employed on a freight train only as an overlay for or an adjunct of the conventional pneumatic or electropneumatic (EP) brake control system. Unlike the ECP brake control system, the conventional EP brake control system in the locomotive uses the brake pipe to convey pneumatically to every railcar in the train all of the brake commands, not just the emergency commands.

In addition to the cab station unit, the conventional EP brake control system includes a brake control computer (BCC) and a pneumatic operating unit (POU). The BCC responds to the signals output by the cab station unit, i.e., by the handle(s) and/or push buttons. Based on these and other signals and on the software that dictates its operation, the BCC controls the operation of various pneumatically and electropneumatically operated devices that comprise the POU. Comprised mainly of pneumatic logic circuitry and solenoid operated valves, these devices are commonly referred to as operating portions. It is through these operating portions that the BCC actually controls the pressure in the brake pipe (and in various other pneumatic trainlines and reservoirs).

The conventional pneumatic brake equipment on each railcar includes a pneumatic brake control valve such as an ABD, ABDX or ABDW type valve made by the Westinghouse Air Brake Technologies Corporation (WABTEC). The brake control valve (BCV) has a service portion and an emergency portion, both mounted to a pipe bracket. The pipe bracket features a number of internal passages and several ports. Each port connects to one of the interconnecting pipes from the railcar such as those leading to the brake pipe, the brake cylinder(s) and the two reservoirs. It is through the ports and internal passages of the pipe bracket that the service and emergency portions of the BCV communicate fluidly with the pneumatic piping on the railcar.

By moving the automatic brake handle, the train operator in the locomotive can control the pressure level in the brake pipe and thereby direct whether, and to what extent, the brakes are applied. By changing its pressure level using the automatic brake handle, the brake pipe is used to convey release, service and emergency brake commands to the pneumatic brake equipment on every railcar. In response to a release brake command (i.e., when brake pipe pressure is restored to its normal operating pressure), the service portion of the BCV not only charges the two reservoirs with the pressurized air it receives from the brake pipe but also vents the brake cylinder(s) to atmosphere thereby causing the brakes on the railcar to release. In response to a service brake command (i.e., when brake pipe pressure is reduced at a service rate), the service portion supplies air from only the auxiliary reservoir to the brake cylinder(s) to apply the brakes. How much the brake pipe pressure is reduced, and thus the magnitude of the service brake application, depends on how far the automatic brake handle is moved towards the full service position. In response to an emergency brake command (i.e., when the brake pipe is vented to atmosphere at an emergency rate), the service and emergency portions of the BCV supply air from both reservoirs to the brake cylinder(s) to apply the brakes more quickly and forcefully.

Under the control of a conventional EP brake control system, the brake pipe, or more accurately the pressure level contained within it, determines whether a BCV will charge its two reservoirs or deliver pressurized air previously stored in one or both of its reservoirs to the brake cylinder(s).

On a freight train equipped with both types of brake control systems, the train operator in the locomotive can thus select whether the conventional EP brake control system or the ECP brake control system will be used to operate the brakes. When the conventional braking mode is selected, the brake pipe is used to convey the brake commands pneumatically to the pneumatic brake equipment on each railcar. When the ECP braking mode is selected, the ECP trainline conveys the brake commands electrically to the ECP brake equipment on the railcars, with the brake pipe also being used to convey emergency brake commands as a safety measure.

Mounted to the pipe bracket of the BCV on each railcar is the ECP manifold assembly, generally designated 1 in FIG. 1. Shown only in part, the ECP manifold assembly 1 includes a manifold 150 and a cover plate 200. It is within the ECP manifold 150 that at least some of the aforementioned valves are contained. The ECP manifold 150 contains four boreholes: the cut-out borehole 10, the vent borehole 30, the auxiliary borehole 50 and the emergency borehole 70. Boreholes 50 and 70 are often called fill boreholes. Each of these boreholes has multiple bores, each of which being of progressively narrower diameter, as viewed in succession from top to bottom, to accommodate the contour of the particular valve assembly housed within it.

The ECP manifold 150 also defines several internal passages. The emergency passage 2 interconnects the bottom portion 71 of emergency borehole 70 with the emergency reservoir on the railcar. Likewise, the auxiliary passage 3 pneumatically links the bottom portion 51 of auxiliary borehole 50 to the auxiliary reservoir. Branching off the auxiliary passage 3 is the pilot airway 4. The vent passage 5 interconnects the middle portion 33 of vent borehole 30 to atmosphere. The inlet passage 6 interconnects the middle portion 13 of cut-out borehole 10 with the service portion of the BCV. In an ABDX brake control valve, for example, inlet passage 6 is preferably connected to the cl passage in the service portion. Communicating with the lower portions 12, 32, 52 and 72 of boreholes 10, 30, 50 and 70, respectively, is the common passage 7. The common passage 7 interconnects these lower portions to the brake cylinder(s).

The ECP manifold 150 houses several valve assemblies (i.e., "valve inserts"). Borehole 10 is used to house the cut-out valve insert 100. Borehole 30 is used to house the vent valve insert 300. Borehole 50 is used to house the auxiliary valve insert 500, and borehole 70 the emergency insert 700. Valve inserts 500 and 700 are often called fill inserts. The inserts shown in FIG. 1 employ a design that is well known in the art.

The valve inserts are contained within manifold 150 by cover plate 200. Although only one is shown, four pilot passages 8 are defined in cover plate 200, one atop each borehole. Above cut-out insert 100, for example, pilot passage 8 communicates with the top portion 17 of borehole 10. Above valve inserts 300, 500 and 700, the other pilot passages communicate with the top portions 37, 57 and 77 of boreholes 30, 50 and 70, respectively.

As best shown in FIGS. 2 and 3, each valve insert includes a primary bushing 800 and a piston assembly 900. The bushing 800 defines a central bore comprised of upper, middle, and lower cavities 801, 802 and 803. Upper cavity 801 has a larger diameter than middle cavity 802. Consequently, there is an annular ledge at the bottom of upper cavity 801 where the central bore narrows to the middle cavity 802. Likewise, there is an annular ledge at the top of lower cavity 803. The primary bushing 800 also features two annular valve seats within the central bore. The first valve seat 810 is formed on the annular ledge at the bottom of upper cavity 801, and the second valve seat 830 is formed on the annular ledge at the top of lower cavity 803. Each valve seat is flat and formed at an angle with respect to the longitudinal axis of the central bore. If viewed 3-dimensionally, each valve seat would appear as a conic ring-shaped surface.

The primary bushing 800 also has three annular flanges formed around its periphery. Annular flange 811 is situated around the top of bushing 800. Annular flanges 812 and 813 are situated around the middle and bottom, respectively, of bushing 800. The outside diameter of each flange is identical, and each flange defines a groove in which an o-ring is secured. Equipped with its o-rings, the primary bushing 800 is designed to fit snugly within any of the boreholes in the ECP manifold 150. The o-rings prevent leakage between the various portions of the borehole in which a valve insert is housed.

The piston assembly 900 is designed to fit within the central bore of the primary bushing 800. The piston assembly 900 includes an insert piston 910 and sealing elements 920 and 930. From the head 911 of the piston extends a shaft 912. The head 911 has an annular collar 913 formed around its periphery. This collar defines a groove in which an o-ring 914 is secured. This o-ring 914 prevents air from leaking around the head 911. The head 911 at its top also has a knob 915.

The shaft 912 has three rims formed around its periphery. Sealing element 920 is secured around shaft 912 between rim 921 and the underside of head 911, and sealing element 930 is affixed about shaft 912 between rims 922 and 923. The bottom outside edge of sealing element 920 is designed to seal flush against first valve seat 810. Likewise, the top outside edge of sealing element 930 is designed to seal flush against second valve seat 830. Sealing element 920 and first valve seat 810 together serve as an upper valve, and sealing element 930 and second valve seat 830 together serve as a lower valve.

As best shown in FIG. 3, a spring 940 is disposed around insert piston 910 in compression between the underside of collar 913 and the ledge at the bottom of upper cavity 801. This spring biases the insert piston 910 upward so that the lower valve is normally closed and the upper valve is normally open.

The valve inserts shown in FIG. 1 are essentially identical, except that valve insert 300 is not equipped with a secondary insert often referred to as a booster. FIG. 2 shows a valve insert with a booster, and FIG. 3 shows one without. The booster, generally designated 950, has a secondary piston 960 housed within a secondary bushing 970. At its top, bushing 970 has an annular lip 971 that limits upward movement of piston 960.

The secondary piston 960 has an annular flange 961 formed around its periphery. This flange defines a groove in which an o-ring 962 is secured. This o-ring prevents air from leaking around piston 960. The underside of piston 960 contains a hollow shaft 964. This hollow shaft is designed to cooperate with the knob 915 of insert piston 910, as shown in FIG. 2.

Mounted to the top of cover plate 200 are four solenoids, only solenoid 110 of which is shown in FIG. 1. Above each valve insert, one solenoid communicates with the pilot airway 4 and the pilot passage 8 for its corresponding borehole. Each solenoid has an armature stem around which lies an energizable coil. At its head end, the armature stem has a seal. When the coil is deenergized, the armature stem has its head end biased against the top of cover plate 200 above the valve insert. This seals off the pilot passage 8 from the pilot airway 4 and the auxiliary reservoir connected thereto, and thereby prevents pressurized air from acting against the top of the valve insert.

In selecting which brake control system will direct control of the brakes, the train operator in the locomotive ultimately determines the state of the cut-out valve insert 100 in ECP manifold 150. When the conventional EP braking mode is selected, the CCU on each railcar is not commanded via the ECP trainline to energize the solenoid 110 for cut-out valve insert 100. This leaves cut-out valve insert 100 in its cut-out state, i.e., its lower valve closed and its upper valve open. (As is clear from FIG. 1, the lower valve is not used.) Consequently, whenever the conventional brake control system conveys a brake application command along the brake pipe, the cut-out valve insert 100 will allow pressurized air to flow through its upper valve and into the brake cylinder(s). Specifically, air from the cl passage in the service portion of the BCV will be allowed to flow into inlet passage 6 and through the middle and lower portions 13 and 12 of borehole 10. The pressurized air will then flow past valve seat 810 and through common passage 7 into the brake cylinder(s), and thereby cause the brakes on the railcar to apply.

When the ECP braking mode is selected, the CCU on each railcar receives a signal via the ECP trainline to energize the solenoid 110. When energized, solenoid 110 electromagnetically compels its armature stem upward, and thereby interconnects the pilot passage 8 of valve insert 100 to the pilot airway 4. Pilot air from the auxiliary reservoir then acts against the top of secondary piston 960. As the pilot pressure builds, the hollow shaft 964 encompasses the knob 915 and soon pushes insert piston 910 downward against the bias of spring 940. This forces cut-out valve insert 100 into its cut-in state, i.e., its upper valve closes. In this state, the cut-out valve insert 100 cuts off inlet passage 6 from common passage 7, and thereby disconnects the brake cylinder(s) from the C1 passage in the service portion of the BCV.

Furthermore, in the ECP braking mode, the brakes are released or applied only by exhausting or pressurizing the brake cylinder(s) through the vent, auxiliary and emergency valve inserts 300, 500 and 700. The CCU on each railcar receives the brake release and application commands via the ECP trainline and energizes the solenoid(s) above the appropriate valve insert(s).

Whenever the ECP brake control system conveys a brake application command along the ECP trainline, for example, the CCU will energize the solenoid above either auxiliary valve insert 500 or emergency valve insert 700 or both. (In practice, it is the emergency valve insert that is typically activated in response to a service brake command.) Pilot air from the auxiliary reservoir then acts against the top of secondary piston 960. As the pilot pressure builds, the hollow shaft 964 encompasses the knob 915 and soon pushes insert piston 910 downward against the bias of spring 940. This forces the emergency valve insert 700 into its energized state, i.e., its upper valve closed and its lower valve opened. (As is clear from FIG. 1, the upper valve is not used.) In this state, the emergency insert 700 allows pressurized air to flow from the emergency reservoir through its lower valve and into the brake cylinder(s). Specifically, air flows from the emergency passage 2 into the bottom portion 71 of borehole 70. The pressurized air then flows past valve seat 830 through common passage 7 and into the brake cylinder(s), and thereby causes the brakes to apply.

Whenever the ECP brake control system conveys a brake release command along the ECP trainline, the CCU will energize the solenoid above vent valve insert 300. Pilot air from the auxiliary reservoir then acts against the top of insert piston 910. As the pilot pressure builds, the insert piston 910 moves downward against the bias of spring 940. This forces the vent valve insert 300 into its energized state, i.e., its upper valve closed and its lower valve opened. (As is clear from FIG. 1, the upper valve is not used.) In this state, the vent insert 300 allows the pressurized air previously developed within the brake cylinder(s) to flow through its lower valve to atmosphere. Specifically, air flows from the brake cylinders(s) through common passage 7 into the bottom portion 31 of borehole 30. The pressurized air then flows past valve seat 830 through vent passage 5 to atmosphere, and thereby causes the brakes to release.

The cut-out and fill valve inserts 100, 500 and 700 were initially designed without boosters 950. This led to problems with the operation of the ECP manifold assembly 1. For example, when a fill valve 500 or 700 was returned to its deenergized state (i.e., lower valve closed) after the brake cylinder was charged, pressurized air from the brake cylinder was free to flow through common passage 7 past the opened upper valve and work against seal 914 surrounding the underside of head 911. Unfortunately, the build up of pressure under the head 911 served to resist downward movement of the insert piston 910. Consequently, to move the fill valve insert to its energized state (i.e., lower valve opened), this meant that more pilot pressure was needed to move the piston insert 911 downward against the combined forces of spring 940 and the brake cylinder pressure acting on the underside of head 911.

It was soon learned, however, that pressure in the auxiliary reservoir can, under certain conditions, be too low relative to the brake cylinder pressure to operate the fill valve properly. Under those conditions, the pilot pressure (from the reservoir via passage 3, pilot airway 4 and pilot passage 8) acting on the top of head 911 was insufficient to move the piston assembly 900 downward to the open position. This meant that no more pressurized air could be delivered to the brake cylinder when the brakes were being operated in the ECP braking mode. For this reason, a booster was added to both the fill and cut-out valves.

The booster 950 allowed better operation of the piston assemblies 900 during those times when pressure in the auxiliary reservoir fell low relative to the brake cylinder pressure. Specifically, as best shown in FIG. 2, the seal 962 around piston 960 of the booster has a larger surface area than the seal 914 around the head 911 of insert piston 910. The pilot pressure acting against the larger effective area atop the secondary piston 960 allows more downward force to be generated against the piston assembly 900. (Multiplying the effective area of a side of a piston by the pressure impinging on it gives the force acting on that side of the piston.) This enabled the pilot pressure to more easily overcome the opposing force caused by the build up of pressure on the underside of the head 911 of insert piston 910.

Despite the improvement in performance it offered, the booster did not address all of the problems associated with the prior art valve inserts. One problem lies with the pressure imbalance inherent to the design of the cut-out and fill valve inserts 100, 500 and 700. The o-ring seal 914 around the head 911 of insert piston 910 has a relatively large effective area. It is larger than that of the sealing element 930 used with the second valve seat 830 to form the lower valve. This difference in effective area has the effect of making the piston assembly 900 self-energizing towards the closed position. As the brake cylinder pressure increases, the force on underside of piston head 911 increases accordingly, and tends to force the lower valve towards the closed position. Consequently, to increase the brake cylinder pressure as is needed to apply the brakes more forcefully, pilot pressure of greater intensity must be applied atop the secondary piston 960 to open the valve insert.

Another problem lies with the unguided movement of the insert piston 910 within the primary bushing 800 for all of the prior art valve inserts. Rims 921 and 922 each have a surface angled to comport with its associated seat 810 and 830, respectively, to help guide the movement of insert piston 910 within the central bore of bushing 800. These rims, however, do little to prevent the lower end of the shaft 912 from moving to and fro or left or right, as best viewed in FIG. 2. This is often referred to as the bell clapper effect. Consequently, when pilot pressure is removed, rims 921 and 922 may not always be aligned with the longitudinal axis of the central bore as spring 940 retracts the insert piston 910 upward. The piston assembly 900 can then get stuck in the open position.

OBJECTIVES OF THE INVENTION

It is, therefore, an objective of the invention to provide a vent valve insert whose design prevents non-longitudinal movement of the piston assembly as it is moved longitudinally within the bushing assembly and thereby prevents the bell clapper effect suffered by the prior art vent valve inserts.

A further objective is to provide a vent valve insert that exhibits a spring load and a valve seat design that together provide a much more reliable seal than the prior art vent valve inserts, especially at low pressures and low temperatures.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the drawings and claims presented herein.

SUMMARY OF THE INVENTION

The foregoing objectives and advantages are attained by an innovative vent valve insert. In its various embodiments, the vent valve insert comprises a bushing assembly, a piston assembly and a spring. Formed around the bushing assembly is a plurality of annular flanges. Each annular flange defines a groove in which an o-ring is secured. The B-rings allow the bushing assembly to fit snugly and sealingly within a suitable borehole, such as the vent borehole of an ECP manifold assembly. The bushing assembly defines a longitudinal bore having an upper cavity, an intermediate cavity and a lower cavity. It also defines a first port hole connected to the lower cavity. The bushing assembly also has a lower spring seat formed circumferentially at a bottom of the upper cavity. It also has an annular valve seat formed about the longitudinal bore. This valve seat faces downward to a bottom area subjacent to the lower cavity. The annular valve seat features a raised inner portion tapering off at a predetermined angle to a sloped outer portion. Reciprocatable within the longitudinal bore between open and closed positions, the piston assembly comprises an insert piston and an annular sealing member. The insert piston has its head disposed in the upper cavity, with its stem extending downwardly therefrom through the lower cavity. The head has an annular collar. This collar defines a groove in which a first annular seal is disposed to prevent leakage around the head. The stem has a bottom portion to which the annular sealing member is secured. The annular sealing member has a flat upper surface for sealingly engaging the raised inner portion of the annular valve seat when the piston assembly occupies the closed position. The vent valve insert also features a means for preventing non-longitudinal movement of the piston assembly as it is moved longitudinally within the longitudinal bore. Disposed around the insert piston, the spring lies in compression between an underside of the annular collar and the lower spring seat. The spring biases the piston assembly in the longitudinal bore to the closed position. In the open position, the piston assembly has pilot pressure acting on a control surface atop its head. The pilot pressure overcomes the spring to force the annular sealing member downward off of the annular valve seat and thereby establish communication between the lower cavity and the bottom area. In the absence of pilot pressure, the piston assembly is returned upward to the closed position by the spring. The expansion of the spring pulls the annular sealing member up against the annular valve seat and thereby cuts off communication between the lower cavity and the bottom area.

BRIEF DESCRIPTION OF THE DRAWINGS

FIG. 2 is an enlarged, cross-sectional view of the prior art valve insert of FIG. 1 equipped with a booster.

FIG. 3 is an enlarged, cross-sectional view of the prior art valve insert of FIG. 1 not equipped with a booster.

DETAILED DESCRIPTION OF THE INVENTION

Figure 1:
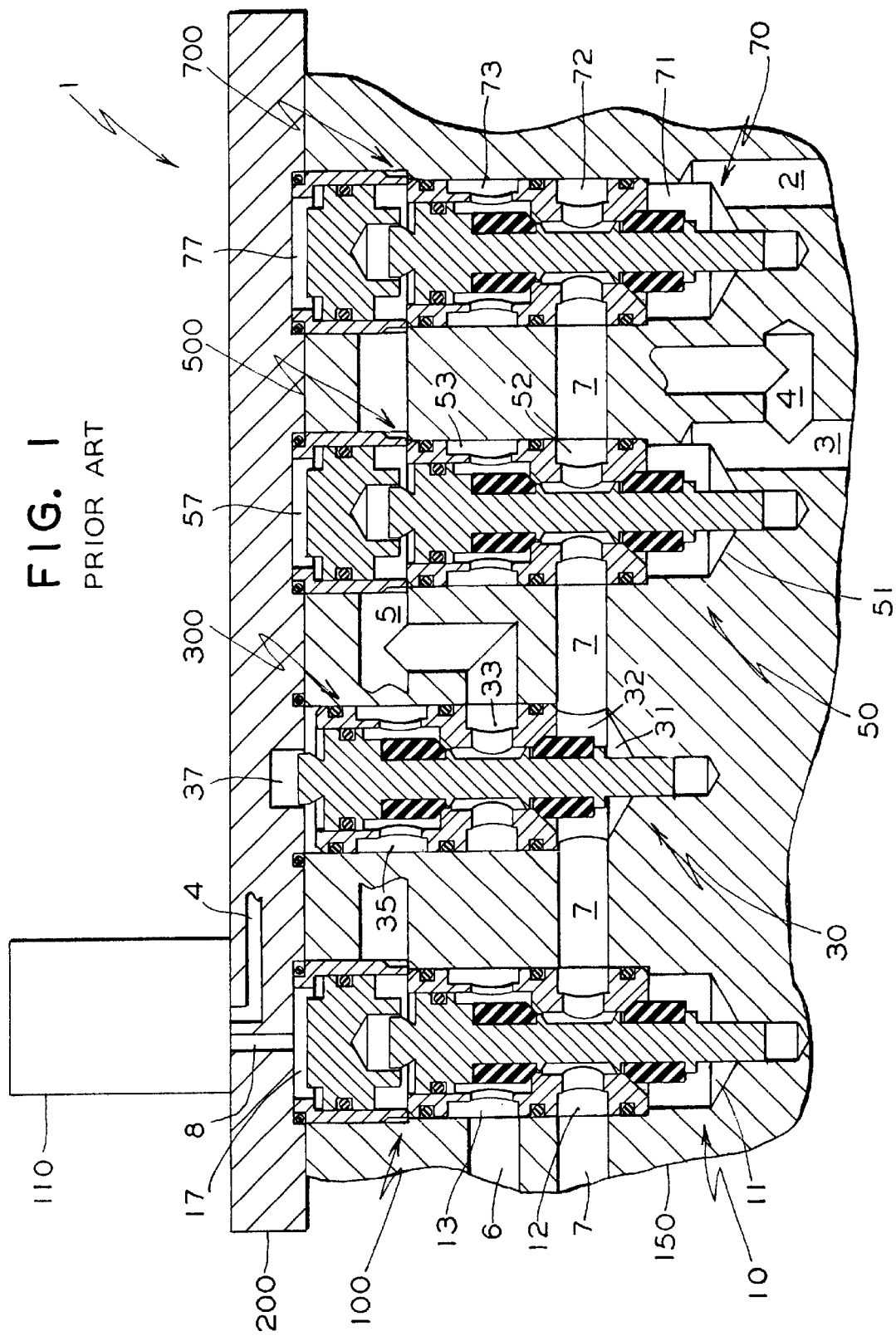
FIG. 1 is a cross-sectional view of an ECP manifold assembly containing four prior art valve inserts, deployed from left to right as a cut-out valve insert, a vent valve insert and two fill valve inserts.

Before describing the invention in detail, the reader is advised that identical components having identical functions have been marked, where possible, with the same reference numerals in each of the accompanying Figures. This has been done for the sake of clarity and to improve understanding of the invention.

Figure 4:
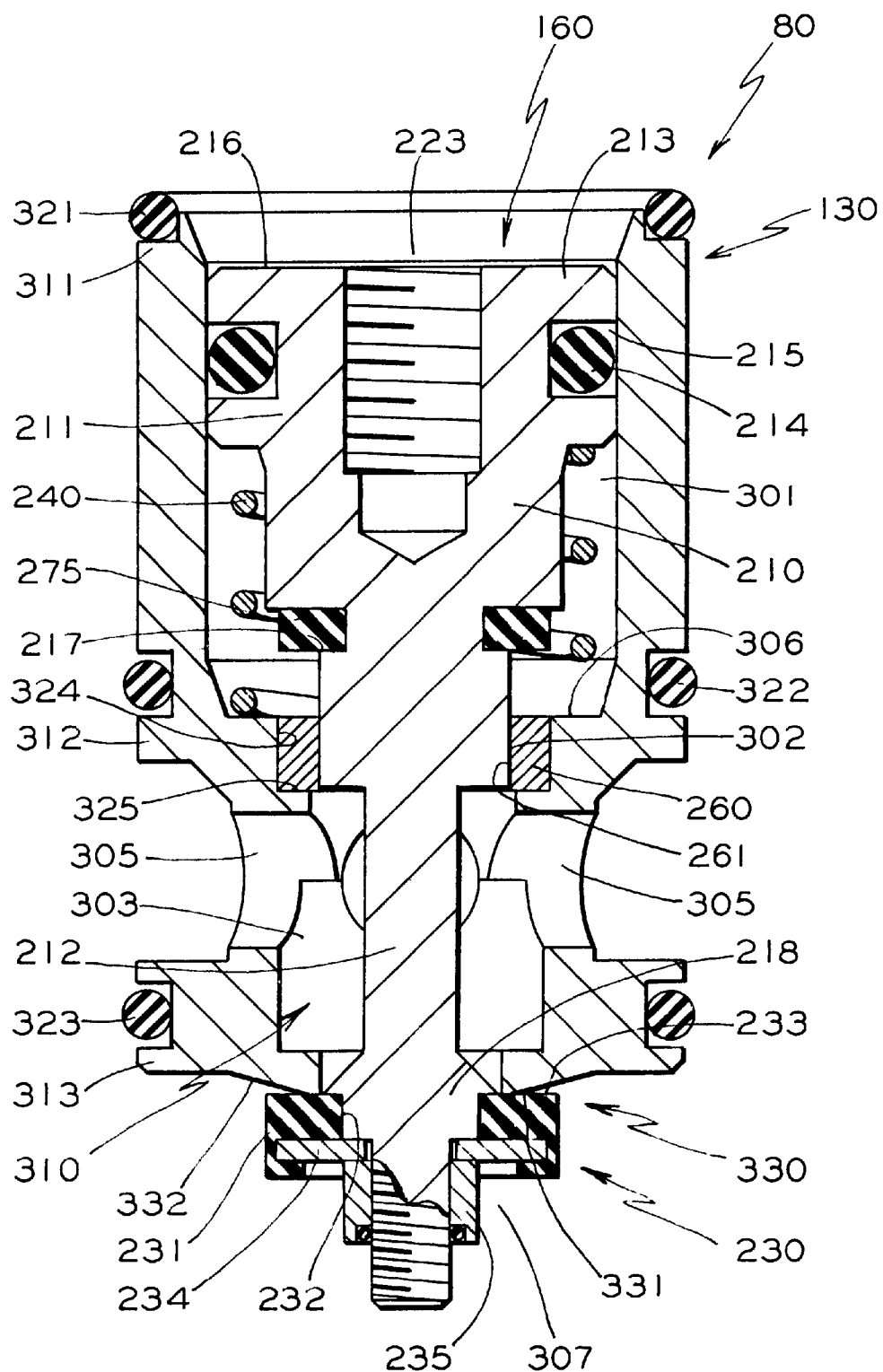
FIG. 4 is a cross-sectional view of a vent valve insert according to one embodiment of the invention.
Figure 5:
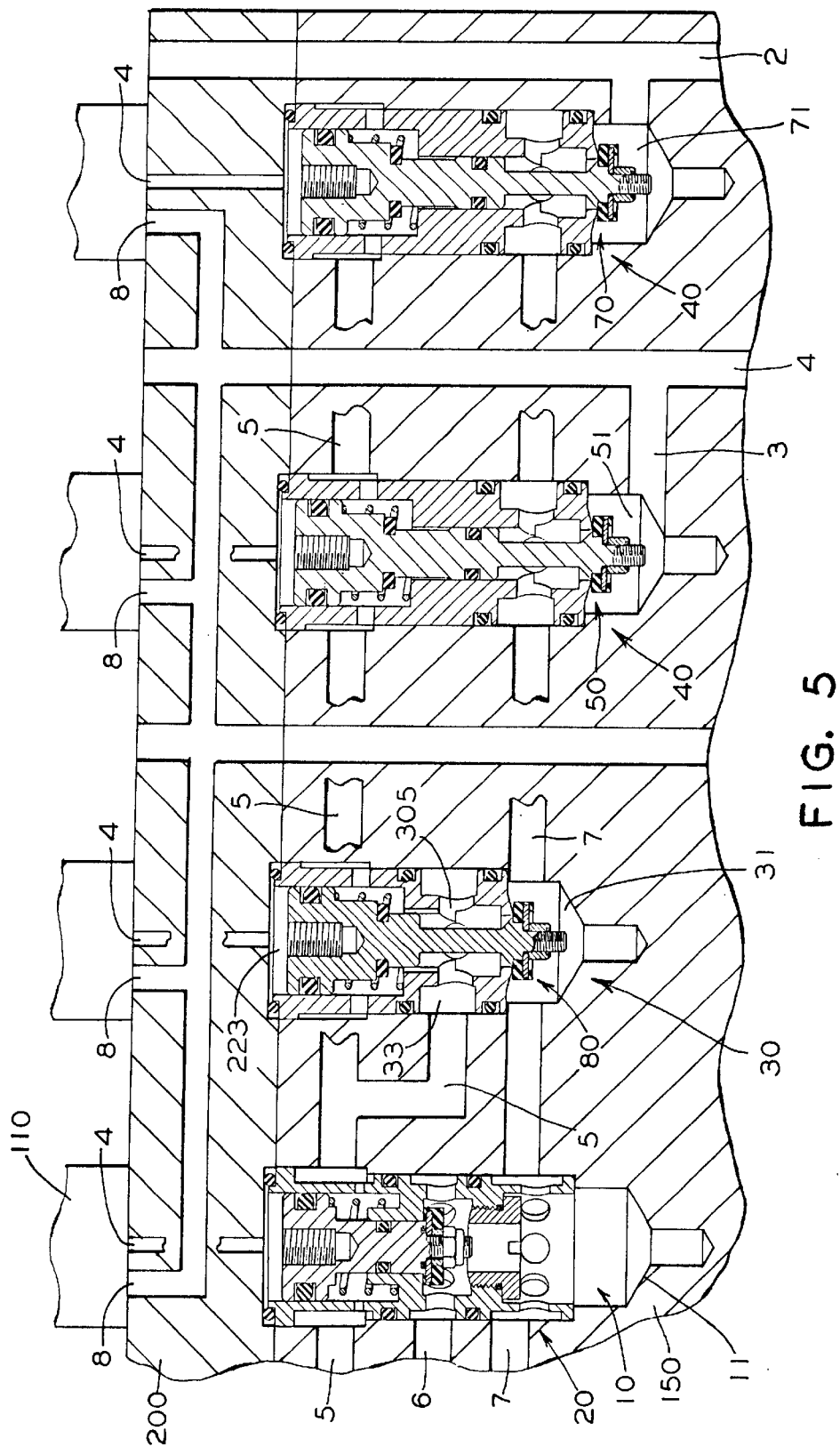
FIG. 5 is a cross-sectional view of an ECP manifold assembly showing, second from left, the vent valve insert of FIG. 4.

FIGS. 4 and 5 illustrate one embodiment of the invention, namely, a vent valve insert, generally designated 80. The invention is described below as if intended for the environment set out in the background section of this document. Despite being described in the context of an ECP manifold assembly, it should be apparent from a reading of this document that the invention may be implemented in a variety of fluid control systems, even ones unrelated to the railroad industry. The invention is presented in this context not to limit the scope of the claims set forth below but merely to simplify the description, and thus the understanding, of the invention.

The innovative vent valve insert 80 comprises a bushing assembly, a piston assembly, a guide ring and a spring, as best shown in FIG. 4. Formed around the bushing assembly, generally designated 130, is a plurality of annular flanges 311, 312 and 313. The flanges are situated near the top, middle and bottom, respectively, of bushing assembly 130. Each flange defines a groove around its periphery in which an o-ring is secured. The flanges and o-rings allow the bushing assembly 130 to fit snugly and sealingly within a suitable borehole, such as vent borehole 30 of the ECP manifold 150 depicted in FIG. 5. The o-rings 321, 322 and 323 prevent leakage between the various portions of the borehole in which the vent valve insert 80 is to be housed. The top o-ring 321, for example, provides the seal between the bushing assembly 130 and the cover plate 200 that covers it.

The bushing assembly 130 defines a longitudinal bore, generally designated 310, within which to house the piston assembly. The longitudinal bore 310 has an upper cavity 301, an intermediate cavity 302 and a lower cavity 303. Bushing assembly 130 also defines one or more first port hole(s) 305 in direct communication with the lower cavity 303.

Bushing assembly 130 also has a lower spring seat 306 formed circumferentially at a bottom of upper cavity 301. It also features an annular valve seat, generally designated 330, formed circumferentially about the lower cavity 303. The valve seat 330 faces downward to a bottom area 307 subjacent to the lower cavity 303. Annular valve seat 330 features a raised inner portion 331 tapering off at a predetermined angle to a sloped outer portion 332. Generally, the predetermined angle can be in the range of 25 to 35 degrees. It is preferably 30 degrees, although it can be adjusted according to various constraints such as the environment in which the vent valve insert 80 is to be used.

The piston assembly, generally designated 160, is designed to fit, and be reciprocated longitudinally, within the longitudinal bore 310 of bushing assembly 130. Piston assembly 160 includes an insert piston 210 and an annular sealing member, generally designated 230. Insert piston 210 has its head 211 disposed in upper cavity 301, with its stem 212 extending downwardly therefrom through lower cavity 303. The head 211 has an annular collar 213 around its periphery and defines a chamber 223 within its top. A groove 215 defined around the annular collar 213 accommodates a first annular seal 214 to prevent leakage around the head 211 of insert piston 210.

The guide ring 260 is secured to an interior cylindrical wall 324 of bushing assembly 130. This cylindrical wall 324 defines intermediate cavity 302. The guide ring 260 lies upon an annular ledge 325 at the base of the cylindrical wall 324. FIG. 4 illustrates a middle portion of stem 212 extending through a throughhole or aperture 261 defined in guide ring 260. The guide ring 260 prevents non-longitudinal movement of the piston assembly 160 as it is moved longitudinally within longitudinal bore 310.

The middle portion of stem 212 is dimensioned to fit and slide smoothly within the aperture of guide ring 260. Due to its precise fit within the aperture 261, the middle portion of stem 212 prevents the bottom end of the stem 212 from jostling to and fro or left or right, as viewed in FIG. 4. This design not only guides the movement of the insert piston 210 within bushing assembly 130 but also prevents the bell clapper effect suffered by the prior art vent valve inserts.

Taken together, the interior cylindrical wall 324 and the guide ring 260 secured therein may essentially be considered as a means for preventing non-longitudinal movement of the piston assembly 160 as it is moved longitudinally within longitudinal bore 310. It should be understood that this means could also be implemented using various other componentry and arrangements.

Secured to a bottom portion of stem 212, the annular sealing member 230 comprises an annular disk 231. The annular disk 231 defines a throughhole 232 through which the bottom portion of stem 212 extends. Comprised of a resilient material, the disk 231 has a flat surface 233 for sealingly engaging the raised inner portion 331 of valve seat 330 when piston assembly 160 occupies the closed position within the longitudinal bore 310.

Disposed around insert piston 210, the spring 240 lies in compression between an underside of the annular collar 213 and the lower spring seat 306. It preferably conveys a load of 3 lb., as compared to the 2 lb. load offered by the springs used with the prior art vent valve inserts. Spring 240 biases the piston assembly 160 in the longitudinal bore 310 to the closed position. In the closed position, piston assembly 160 cuts off lower cavity 303 from the bottom area 307 subjacent to the lower cavity. In the open position, the piston assembly allows communication between the bottom area 307 and the lower cavity 303.

Referring again to the bushing assembly 130, the first port hole(s) 305 are designed to align with the vent passage 5 in ECP manifold 150. This is best illustrated in FIG. 5, at second from left. Vent valve insert 80 is shown housed within the vent borehole 30, with its first port hole(s) 305 in communication with the middle portion 33 of vent borehole 30 and therethrough with vent passage 5. In addition, the bottom area 307 is manifested as the bottom portion 31 of vent borehole 30. The bottom area 307 thus communicates with the common passage 7 and therethrough with the brake cylinder(s) of the railcar on which the invention is installed. At the top of head 211 of insert piston 210, the chamber 223 is aligned with the pilot airway 4 in cover plate 200.

Absent pilot pressure acting against the top surface 216 of insert piston 210, the spring 240 acts to force the piston assembly upward within the longitudinal bore 310. Secured to the bottom portion of stem 212, the annular sealing member 230 is thus moved upward by spring 240 so that its flat surface 233 sealingly seats against the raised inner portion 331 of annular valve seat 330. The vent valve insert 80 is thus normally biased to the closed position wherein the lower cavity 303 and the first port hole(s) 305 therewith are cut off from bottom area 307.

When pilot pressure from pilot airway 4 acts against the top surface 216 of insert piston 210 and into chamber 223 defined therein, the piston assembly 160 is forced downward against the opposing force of spring 240. The downward movement of insert piston 210 causes the flat surface 233 of annular sealing member 230 to unseat from the raised inner portion 331 of annular valve seat 330. Moved to the open position by the pilot pressure, the piston assembly 160 allows the lower cavity 303 and the first port hole(s) 305 in communication therewith to communicate with the bottom area 307. When installed within the vent borehole 30 of ECP manifold 150, the vent valve insert 80 when so opened would allow the pressurized air previously developed within the brake cylinder(s) to escape to atmosphere. Specifically, the air would flow from the brake cylinders(s) through common passage 7 into the bottom portion 31 of borehole 30. The pressurized air would continue to flow past valve seat 330 into lower cavity 303 and through first port hole(s) 305 and vent passage 5 to atmosphere, and thereby cause the brakes of the railcar to release.

FIG. 4 illustrates a backup annular cushion 275. It also shows an annular recess 217 defined around stem 212 at the base of the head 211 of insert piston 210. Secured within this recess 217 is the inner portion of the backup annular cushion 275. When the piston assembly 160 is moved to the open position by the pilot pressure built within chamber 223, the bottom surface of cushion 275 engages the top surface of guide ring 260.

At the bottom of stem 212, the annular sealing member 230 has an internal washer 234 around which the annular resilient disk 231 is formed. The stem 212 also has a rim 218 formed around its periphery near the bottom portion of insert piston 210. With the bottom of stem 212 inserted through its throughhole 232, the sealing member 230 is secured by a nut or like means 235 to the underside of this rim 218. The outer surface of rim 218 is angled downward. This further aids in guiding the piston assembly 160 as it is moved longitudinally within the longitudinal bore 310.

Figure 6:
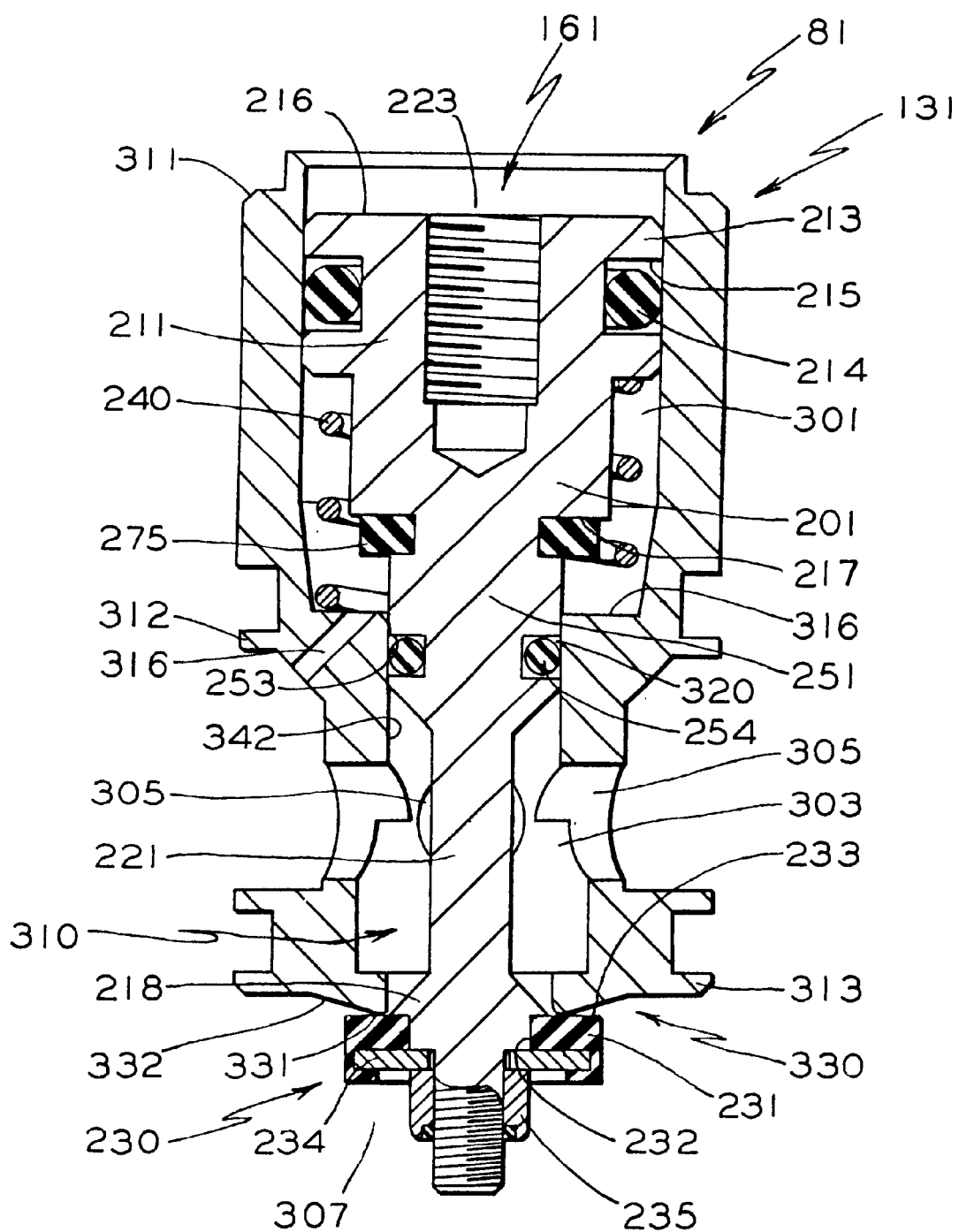
FIG. 6 is a cross-sectional view of a vent valve insert according to another embodiment of the invention.

FIG. 6 shows the preferred embodiment of the invention. In this embodiment, the vent valve insert 81 comprises a bushing assembly 131, a piston assembly 161 and a spring 240, but not the guide ring. The spring 240 is unchanged from that used in the previous embodiment. The bushing and piston assemblies 131 and 161, however, each have certain features that are different than those of the earlier described bushing and piston assemblies 130 and 160, respectively.

Regarding the bushing assembly 131, the upper and lower cavities 301 and 303 are essentially unchanged from the bushing assembly 130 of FIG. 4. The intermediate cavity 320, however, has a different configuration, as the guide ring 260 of the previous embodiment has been eliminated. More specifically, the interior cylindrical wall 342 that defines the intermediate cavity 320 is designed to accommodate a stem 221 of a different design.

Regarding the piston assembly 161, it is designed to fit, and be reciprocated longitudinally, within the longitudinal bore 310 of bushing assembly 131. Piston assembly 161 includes an insert piston 201 and the annular sealing member 230. The insert piston 201, however, has a design that differs from the insert piston 210 of FIG. 4. Its head 211 lies within upper cavity 301, and its stem 221 extends downwardly therefrom through lower cavity 303. The middle portion 251 of stem 221, however, defines an annular groove 253 within which is secured an o-ring 254. The middle portion 251 is dimensioned to fit and slide smoothly within the interior cylindrical wall 342 of bushing assembly 131.

Due to its fit within the intermediate cavity 320, the middle portion 251 of stem 221 prevents the bottom end of stem 221 from jostling to and fro or left or right, as viewed from the perspective of FIG. 6. This design not only guides the movement of insert piston 201 within bushing assembly 131 but also prevents the bell clapper effect suffered by the prior art vent valve inserts.

In this preferred embodiment, the o-ring 254 and the middle portion 251 of stem 221 together serve as a means of preventing non-longitudinal movement of the piston assembly 161 as it is moved longitudinally within longitudinal bore 310. Along with the cylindrical wall 342 within which they are moved, the o-ring 254 and the middle portion 251 thus perform the same function as guide ring 260 does for the other embodiment of the invention (i.e., vent valve insert 80). A vent valve insert that features the former design is, however, less costly to make and easier to manufacture than one that features the guide ring design.

The presently preferred and alternative embodiments for carrying out the invention have been set forth in detail according to the Patent Act. Persons of ordinary skill in the art to which this invention pertains may nevertheless recognize various alternative ways of practicing the invention without departing from the spirit and scope of the following claims. Persons who possess such skill will also recognize that the foregoing description is merely illustrative and not intended to limit any of the ensuing claims to any particular narrow interpretation.

Accordingly, to promote the progress of science and the useful arts, I secure for myself by Letters Patent exclusive rights to all subject matter embraced by the following claims for the time prescribed by the Patent Act.

I claim:

1. A vent valve insert comprising:
   (a) a bushing assembly around which a plurality of annular flanges are formed with each of said annular flanges defining a groove in which an o-ring is secured and which allow said bushing assembly to be incorporated within a suitable borehole, said bushing assembly defining (i) a longitudinal bore having an upper cavity, an intermediate cavity and a lower cavity and (ii) a first port hole connected to said lower cavity, said bushing assembly also having (iii) a lower spring seat formed circumferentially at a bottom of said upper cavity and (iv) an annular valve seat formed about said longitudinal bore that faces downward to a bottom area subjacent to said lower cavity, said annular valve seat featuring a raised inner portion tapering off at a predetermined angle to a sloped outer portion;
   (b) a piston assembly reciprocatable within said longitudinal bore between an open position and a closed position, said piston assembly comprising an insert piston having a head disposed in said upper cavity and a stem extending downwardly therefrom through said lower cavity, said head having an annular collar defining a groove in which a first annular seal is disposed to prevent leakage around said head, said stem having a bottom portion to which an annular sealing member is secured, said annular sealing member having a flat upper surface for sealingly engaging said raised inner portion of said annular valve seat when said piston assembly occupies said closed position;
   (c) a means for preventing non-longitudinal movement of said piston assembly as said piston assembly is moved longitudinally within said longitudinal bore of said bushing assembly; and
   (d) a spring disposed around said insert piston and in compression between an underside of said annular collar and said lower spring seat, said spring for biasing said piston assembly to (i) said closed position wherein said annular sealing member is pulled upward against said annular valve seat to cut off communication between said lower cavity and said bottom area and away from (ii) said open position wherein pilot pressure acting on a control surface atop said head overcomes said spring and forces said annular sealing member downward off of said annular valve seat to establish communication between said lower cavity and said bottom area.

2. The vent valve insert claimed in claim 1 wherein said means comprises:
   (a) a middle portion of said stem around which an annular groove is defined; and
   (b) an o-ring secured within said annular groove; with said middle portion and said o-ring secured therearound being dimensioned to fit and slide smoothly within an interior cylindrical wall of said intermediate cavity.

3. The vent valve insert claimed in claim 2 wherein said predetermined angle is in the range of 25 to 35 degrees.

4. The vent valve insert claimed in claim 3 wherein said predetermined angle is 30 degrees.

5. The vent valve insert claimed in claim 3 wherein said spring has a load of approximately 3 lbs.

6. The vent valve insert claimed in claim 5 wherein said suitable borehole is a vent borehole of a manifold assembly, and said vent valve insert fits within said vent borehole such that said first port hole communicates with a vent passage in said manifold assembly, and said bottom area communicates with a common passage in said manifold assembly.

7. The vent valve insert claimed in claim 1 wherein said means comprises a guide ring secured to an interior wall of said intermediate cavity and through which a middle portion of said stem extends, said guide ring for preventing non-longitudinal movement of said piston assembly as said piston assembly is moved longitudinally within said longitudinal bore.

8. The vent valve insert claimed in claim 7 further including a backup annular cushion disposed around said stem at a base of said head, said backup annular cushion for engaging a top surface of said guide ring when pilot pressure acting on said control surface of said head forces said piston assembly to overcome said spring and move downward to said open position.

9. The vent valve insert claimed in claim 8 wherein said predetermined angle is in the range of 25 to 35 degrees.

10. The vent valve insert claimed in claim 9 wherein said predetermined angle is 30 degrees.

11. The vent valve insert claimed in claim 9 wherein said spring has a load of approximately 3 lbs.

12. The vent valve insert claimed in claim 11 wherein said suitable borehole is a vent borehole of a manifold assembly, and said vent valve insert f its with in said vent borehole such that said first port hole communicates with a vent passage in said manifold assembly, and said bottom area communicates with a common passage in said manifold assembly.

13. The vent valve insert claimed in claim 1 wherein said predetermined angle is in the range of 25 to 35 degrees.

14. The vent valve insert claimed in claim 13 wherein said predetermined angle is 30 degrees.

15. The vent valve insert claimed in claim 1 wherein said spring has a load of approximately 3 lbs.

16. The vent valve insert claimed in claim 1 wherein said suitable borehole is a vent borehole of a manifold assembly, and said vent valve insert fits within said vent borehole such that said first port hole communicates with a vent passage in said manifold assembly, and said bottom area communicates with a common passage in said manifold assembly.

* * * * *